United States Patent
Shen

(10) Patent No.: US 6,625,231 B1
(45) Date of Patent: Sep. 23, 2003

(54) ADAPTIVE PHASE DEMODULATION

(75) Inventor: Qun Shen, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/440,495

(22) Filed: Nov. 15, 1999

(51) Int. Cl.[7] .............................................. H03K 9/00
(52) U.S. Cl. ..................... 375/316; 375/226; 375/269; 375/273; 375/279; 375/280; 375/283; 375/325; 375/324
(58) Field of Search ................................ 375/226, 267, 375/273, 279, 316, 280, 283, 325, 324

(56) References Cited

U.S. PATENT DOCUMENTS

| | | | | |
|---|---|---|---|---|
| 5,440,265 A | * | 8/1995 | Cochran et al. | ............ 329/300 |
| 5,497,400 A | | 3/1996 | Carson et al. | ............... 375/324 |
| 5,517,530 A | * | 5/1996 | Gardner | ...................... 375/325 |
| 5,524,126 A | * | 6/1996 | Clewer et al. | ............... 375/355 |
| 5,553,098 A | * | 9/1996 | Cochran et al. | ............ 375/324 |

* cited by examiner

Primary Examiner—Stephen Chin
Assistant Examiner—Guilleimo Munoz
(74) Attorney, Agent, or Firm—Coats & Bennett, P.L.L.C.

(57) ABSTRACT

Based on changing reception conditions, a wireless receiver adapts its demodulation method during active communications. Phase errors detected in the received signal indicate current reception conditions, and, optionally, received signal strength serves as an additional indicator. The receiver supports operation with fully coherent, fully non-coherent, and partially coherent demodulation. The receiver determines a demodulation quality indicator based on the phase error signal. The value of the demodulation quality indicator increases with increasing phase error. When the demodulation quality indicator is below a first defined threshold, the receiver operates with fully coherent demodulation. When the demodulation quality indicator is above a second defined threshold, the receiver operates with fully non-coherent demodulation. For demodulation quality indicator values between the first and second defined thresholds, the receiver operates with partially coherent demodulation. For partially coherent demodulation, a phase compensation controller in the receiver applies a scaling factor to the phase compensation signal used in fully coherent demodulation. The scaling factor fractionally ranges from a value of one to zero, allowing the phase compensation controller to apply a fractional amount, none, or all of the phase compensation signal to the received signal. The phase compensation controller is optionally responsive to received signal strength in addition to the demodulation quality indicator, and uses the received signal strength to further refine its fractional scaling of the phase compensation signal.

24 Claims, 8 Drawing Sheets

Note: Eq. 4 and Eq. 5 apply only when $T_{MIN} \leq T \leq T_{MAX}$

ADAPTIVE PHASE DEMODULATION

BACKGROUND OF THE INVENTION

1. Field of the Invention

The present invention relates to telecommunications systems in general and in particular to wireless mobile telecommunications systems.

2. Description of the Prior Art

Creating reliable telecommunications systems presents significant challenges to designers and engineers. Designers of mobile telecommunications systems, in particular, face the formidable challenge of balancing cost, size, weight, features, and performance in these increasingly advanced systems. As newer standards emerge, such as the Personal Communication Systems (PCS) standard, the need to enhance the basic reliability of these mobile systems remains ever present.

In wireless telecommunications system design, a transmitter emits a RF signal usually termed a "carrier signal" that is modulated in a predetermined fashion in accordance with the sequence of information being transmitted. At the receiver, this modulated RF signal is received and processed to recover the transmitted information. In reality, the signal received by the receiver is a composite of the originally transmitted signal and unwanted interference and methods exist to mitigate such interference. Various techniques of carrier signal modulation are known and are generally chosen based on power and spectral efficiency, as well as their relative vulnerability to interference. Commonly adopted modulation techniques include frequency modulation (FM), amplitude modulation (AM), and phase modulation (PM). Of course, numerous implementations exist within each general modulation technique, and some implementations embody aspects from two or more of the general techniques.

Mobile telecommunications systems employing phase modulation techniques change or modulate the phase angle of the transmitted carrier signal to convey the information being transmitted. Typically, the stream of data to be transmitted is digitized and encoded, often with error-correction information added, into a stream of multi-bit symbols, with each symbol having a unique and predetermined associated phase angle. The transmitter then modulates its carrier signal in accordance with the phase angle corresponding to each transmitted symbol at a predetermined symbol rate. At the receiver, this phase modulated signal is received and processed to recover the transmitted symbols, which can then be decoded to recover the original information. The process of recovering the phase-modulated symbol information from the received RF signal is termed demodulation and the receiver may employ either coherent or non-coherent demodulation techniques.

In coherent demodulation, the receiver attempts to phase-compensate the received signal to minimize errors in the demodulated signal. A receiver using coherent demodulation can compensate the phase of the received RF signal based on initial estimates of phase and frequency and then adjust that compensation based on measured phase error in the decoded symbols. A receiver using coherent demodulation techniques can demodulate the received RF signal based on the absolute phase angle value of each received signal, or based on the difference in phase angles between two consecutively received symbols, which is termed "differential detection." Non-coherent demodulation is based on differential detection techniques as described above and does not phase-compensate the received signal to minimize errors.

Certain reception conditions favor the use of coherent demodulation versus non-coherent demodulation. Under such conditions, a receiver employing coherent demodulation techniques will have superior performance as compared to an otherwise comparable receiver employing non-coherent demodulation. Here, superior performance is defined as a lower bit error rate (BER) in the information recovered from the received RF signal. However, there exist a range of reception conditions under which a receiver employing non-coherent demodulation will exhibit a lower BER as compared to an otherwise comparable receiver using coherent demodulation.

In the existing art, mobile telecommunications systems are designed to include receivers that fixedly operate using only one of the two techniques, either coherent or non-coherent demodulation. By not adapting the receivers' demodulation technique in accordance with changing reception conditions, the prior art receivers do not operate with the optimal demodulation technique in all circumstances. Accordingly, there remains a need for a mobile telecommunications system having a receiver designed to receive phase-modulated radio signals that can adapt its demodulation technique from coherent to non-coherent operation in response to detected changes in reception conditions, so as to minimize the BER in the received data.

SUMMARY OF THE INVENTION

The present invention fulfills this need in the art by providing a method and apparatus for a mobile telecommunications receiver to operate using an adaptive demodulation scheme. In the present invention, the receiver can operate using fully coherent demodulation, non-coherent demodulation, or "partially coherent" demodulation wherein only a portion of the phase compensation signal normally used in coherent demodulation is applied to the received signal. The receiver according to the present invention can progressively reduce the phase-coherent compensation applied to the received signal in response to changing reception conditions, as indicated by changes in the magnitude of detected phase errors. Increases in the magnitude of phase errors detected in the demodulated signal correspond to increasing inaccuracies in the receiver's phase estimates used to phase compensate the received signal. In the present invention, the receiver using adaptive demodulation fractionally scales or weights its phase compensation signal so that less and less phase compensation is applied to the received signal as the magnitude of detected phase error increases. Beyond a given threshold of detected phase error, the receiver operating with adaptive demodulation in accordance with the present invention, reduces the phase compensation applied to the received signal to zero and operates with fully non-coherent demodulation, as is well understood by those skilled in the art.

DETAILED DESCRIPTION OF THE PREFERRED EMBODIMENT

Figure 1:
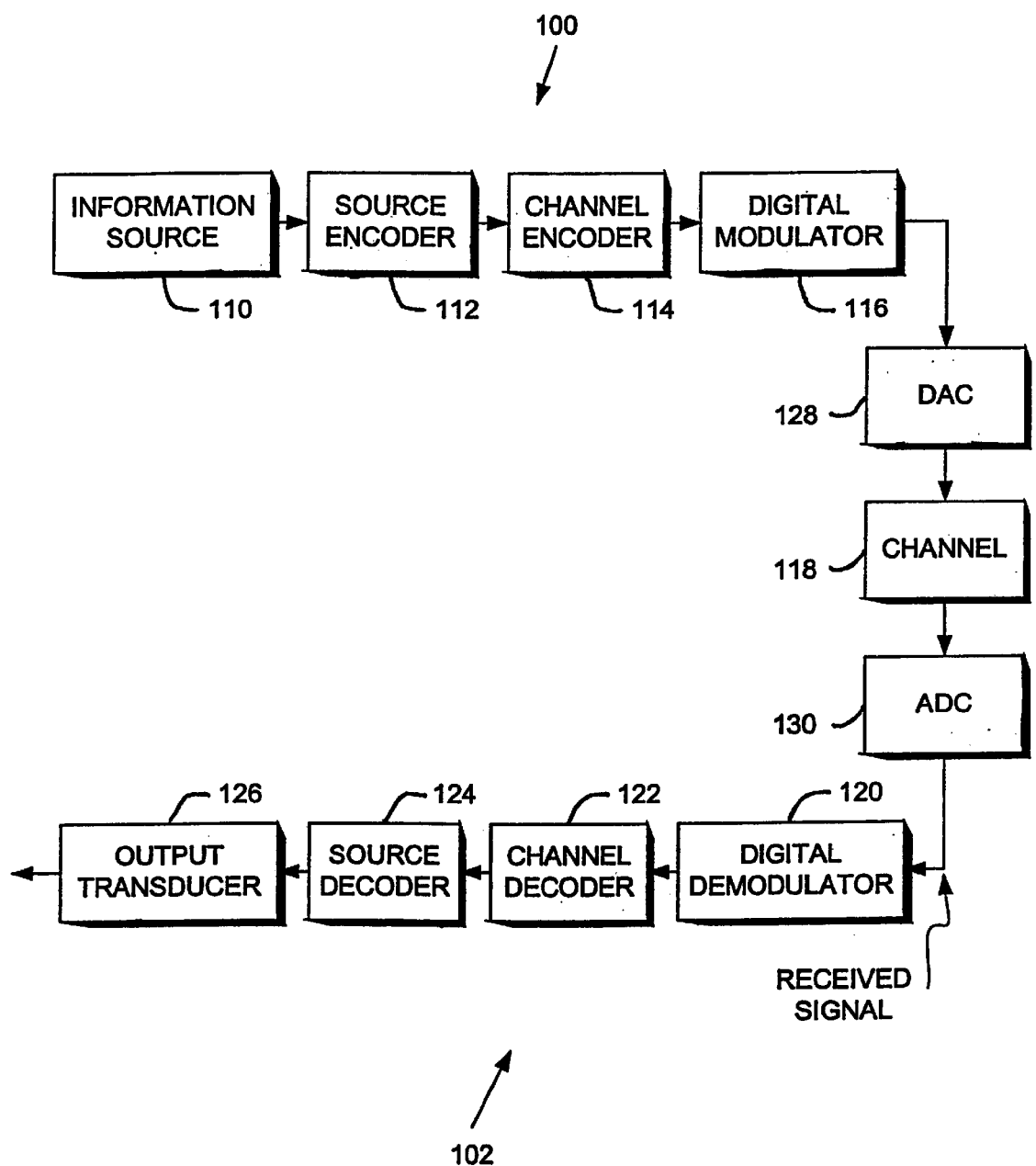
FIG. 1 is a block diagram of a digital communications system.

FIG. 1 illustrates a digital communications system using adaptive demodulation and time-division multiplexed access (TDMA), comprising a transmitter 100 and a receiver 102 that are coupled by a communications channel 118. In FIG. 1, the transmitter 100 includes an information source 110, a source encoder 112, a channel encoder 114, a digital modulator 116, and a digital-to-analog converter (DAC) 128. The information source 110 provides the source data stream that will ultimately be conveyed to the receiver 102 through the channel 118. This source data typically corresponds to a baseband signal and is assumed to be in a digitized format and is passed directly to the source encoder 112. The source encoder 112 removes redundancy or randomizes the source data stream, producing an information sequence that has been optimized for maximum information content. The information sequence from the source encoder 112 is passed to the channel encoder 114.

Channel encoder 114 is designed to introduce an element of controlled redundancy into the information sequence supplied by the source encoder 112 to generate a coded output. While seemingly at odds with the function of source encoder 112, the redundancy added to the information stream by channel encoder 114 serves to enhance the error correction capability of the communications system. By introducing redundant information into the information sequence in a controlled manner, a receiver having knowledge of the codes used can detect and possibly correct errors that may occur during transmission by making use of the redundant information.

The modulator 116 interfaces the channel encoder 114 to the communications channel 118, through the DAC 128. That is, the modulator 116 receives coded output from the channel encoder 114 and, in combination with DAC 128, generates waveforms that both suit the physical nature of the channel 118 and can be efficiently transmitted over the channel 118. There are many different modulation techniques used for digital communication systems. Selection of a particular modulation technique depends on detection performance, power requirements and bandwidth availability. One frequently used modulation scheme used in digital communications systems is $\pi/4$ differential quadrature phase shift keying ($\pi/4$ DQPSK).

In $\pi/4$ DQPSK, the encoded information stream is split into even and odd bit streams with one bit from each stream joined in parallel fashion to form a two-bit symbol; hence there are four possible symbols in $\pi/4$ DQPSK, based on the two-bit binary combinations. Each symbol in the stream of formed symbols corresponds to one of four defined phase angle transitions. Specifically, in $\pi/4$ DQPSK, the allowed phase angle transitions are $\pm\pi/4$ and $\pm 3\pi/4$ and are determined based on the difference in defined phase angles between two consecutive symbols in the symbol stream. In a wireless digital communications system using an RF communications channel and phase modulation, a carrier signal transmitted by the transmitter 100 is phase modulated to convey the symbol information and, hence, the original source information output from information source 110. For $\pi/4$ DQPSK, the carrier signal is modulated by a mixed signal comprised of an in-phase (I) channel and a 90° phase-shifted quadrature (Q) channel.

At the receiver 102 of the digital communications system, a demodulator 120 processes the output signal from analog-to-digital converter (ADC) 130 (which is corrupted by the channel 118 during transmission) at any given time to determine which of the possible signals, or symbols, in the signal constellation was transmitted. Essentially, the demodulator 120 processes the received signal to recover the encoded stream of symbols from the received waveform. For example, when $\pi/4$ DQPSK is used, the demodulator processes the received waveform to determine which symbol was received based on the detected phase angle transition. When the transmitted sequence includes redundancy introduced by channel encoding, the output of the demodulator 120 is passed to a decoder 122 which attempts to reconstruct the original information sequence based on its a priori knowledge of the code used by the channel encoder 114. A measure of how well the demodulator 120 and decoder 122 perform is the frequency with which errors occur in the decoded sequence. If required, the source decoder 124 produces an analog output signal based on the output sequence taken from the channel decoder 122. The source decoder 124 uses its knowledge of the source encoding method to reconstruct the original signal from information source 110. The analog signal typically drives a transducer, such as an audio speaker for voice communications. The difference between the reconstructed signal and the original is a measure of distortion introduced by the communications system. ADC block 130 digitizes the signal received through channel 118 to produce a received signal comprising a stream of digitized values and may advantageously apply selective filtering and gain control or limiting to that signal, as will be readily appreciated by those skilled in the art.

Figure 2:
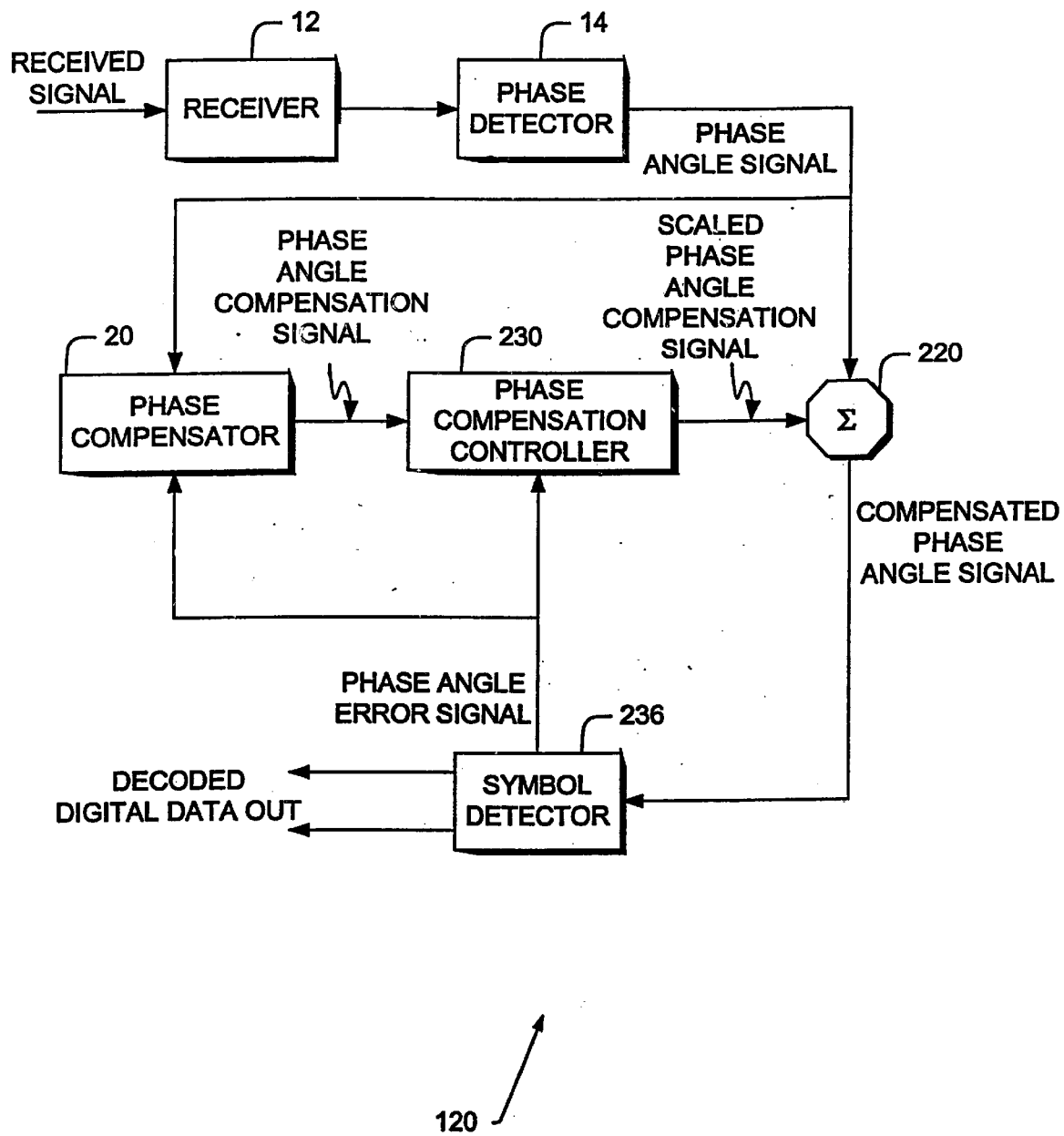
FIG. 2 is a simplified block diagram of an adaptive demodulator in accordance with the present invention.

FIG. 2 is a simplified block diagram of an adaptive demodulator for adaptively demodulating the received signal. The receiver 12 includes synchronization circuits to synchronize with the received signal timing and to down-sample the received signal to produce a digital stream of values corresponding to synchronized symbol-rate sampling. These sample values are output from the receiver portion 12 to the phase detector 14. The phase detector 14 detects the phase angle of the received signal on a per-symbol basis based on the digitized values it receives from the receiver portion 12. The symbol detector 236 outputs digital data corresponding to one of the predefined set of nominal phase angle values that is closest to the actual phase angle value in the signal output from phase detector 14. The symbol detector 236 additionally computes on a per symbol basis a phase error signal based on the actual phase angle in the signal output from the phase detector 14 and the closest or nearest predefined phase angle. The phase error signal is input to phase compensator 20 which produces a phase compensation signal to compensate or correct the phase angle signal output from the phase detector 14. Rather than directly applying the phase compensation signal to the phase angle signal, the phase compensation signal is passed through the phase compensation controller 230. Phase compensation controller 230 takes as an additional input the phase error signal output from the symbol detector 236. Based on the phase error signal, the phase compensator 230 may output the full phase compensation signal, none of the phase angle compensation signal, or a fraction of the phase angle compensation signal. This allows the adaptive demodulator to apply some, all, or none of the phase compensation signal to the phase angle signal based on how well the phase compensation signal output from the phase compensator 20 is actually compensating for phase errors in the phase angle signal.

Figure 3:
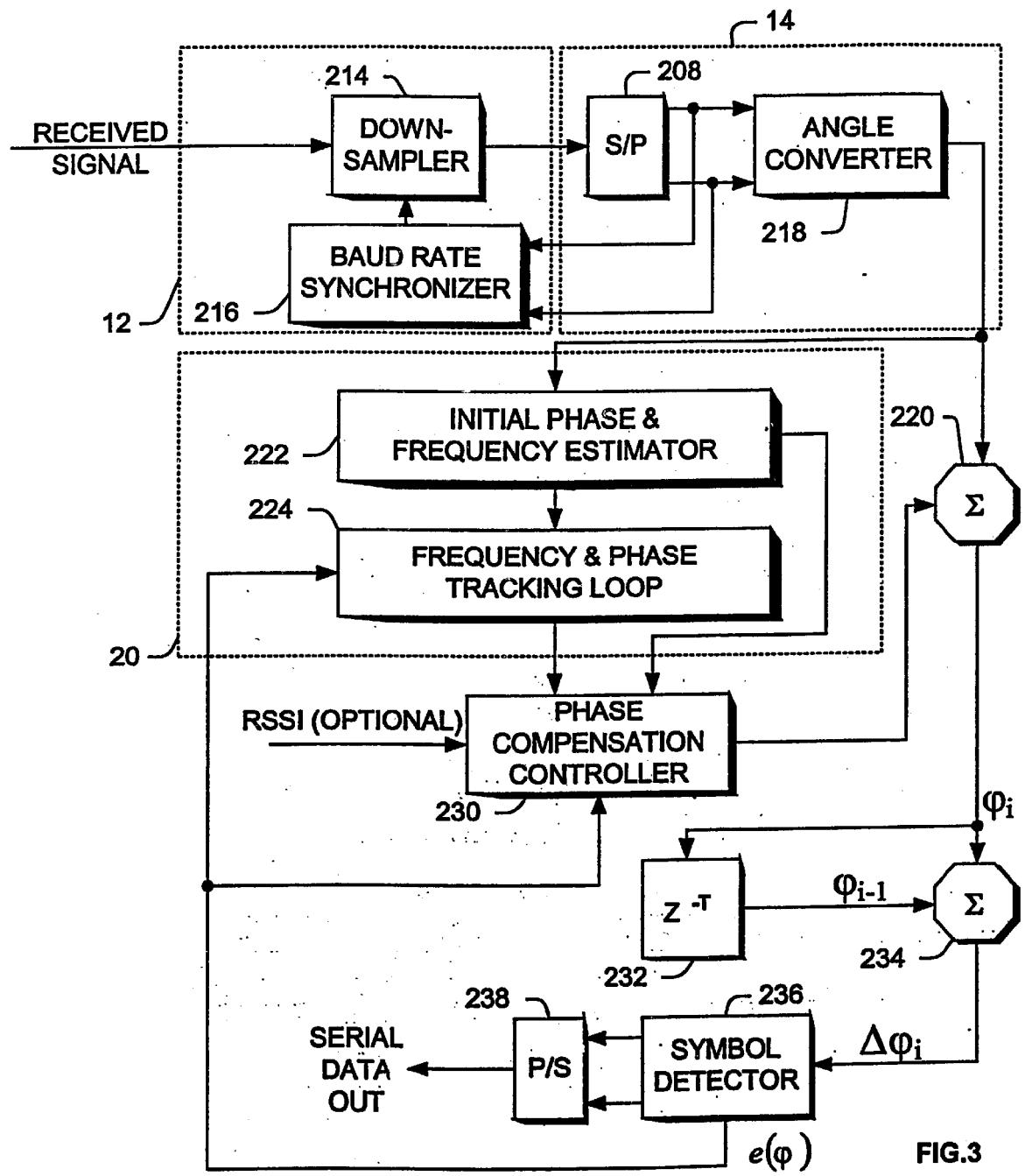
FIG. 3 is a block diagram of an adaptive demodulator in accordance with the present invention.

FIG. 3 is a more detailed block diagram of an adaptive demodulator for adaptively demodulating the received signal. The digitized received signal is input to the down-sampler 214 which cooperates with serial-to-parallel converter (S/P) 208 and the baud-rate synchronizer 216, to produce I and Q outputs containing digitized I and Q samples synchronized to the symbol periods contained in the received signal. Synchronization to the incoming symbol timing is accomplished during the preamble portion of the TDMA frame and the baud rate synchronizer 216 fixes its output to the down-converter before the end of a frame preamble. The preamble portion of a TDMA frame enables this synchronization because it is comprised of a known pattern, recognizable by the receiver.

The digitized I and Q channel signals output from the down-sampler 214 are input to the angle converter 218. Angle converter 218 determines a phase angle signal based on the I and Q channel digitized samples synchronized with the received signal symbol timing. This phase angle signal is output to the initial frequency & phase estimator 224 for initial phase and frequency estimations before the end of the frame preamble as previously described. The phase angle signal is also output to a summing element 220, where it is compensated by a scaled phase compensation signal output by the phase compensation controller 230.

As with the baud-rate synchronizer 216, the initial estimator 222 develops initial phase and frequency estimates for the received signal before the end of a TDMA frame preamble and generates an initial phase compensation signal. These initial frequency and phase estimates, once determined, remain fixed in the initial estimator 222, unless the receiver switches to a different frequency channel or communications are reinitiated. The initial estimator 222 loads values for its fixed frequency and phase estimates into the frequency & phase tracking loop 224. The tracking loop 224 takes as its starting values, the initial frequency and phase estimates determined by the initial estimator 222. The tracking loop 224 generates a tracking phase compensation signal that it subsequently adjusts based on the phase error signal generated by symbol detector 236. The phase compensation controller 230 receives the initial phase compensation signal from initial estimator 222 and the tracking phase compensation signal from the tracking loop 224. The phase compensation controller 230 generates a scaled phase angle compensation signal that is used in the summing element 220 to compensate the phase angle signal output from the angle converter 218. The phase compensation controller 230 initially applies the full-scale initial compensation signal to the phase angle signal output from the angle converter 218 via summing element 220. Then, as the tracking phase compensation signal changes based on the phase error signal generated by the symbol detector 236, the phase compensation controller applies a scaled version of the tracking phase compensation signal. The scaling applied by the phase compensation controller 230 is based on the phase error signal output from symbol detector 236. Summing element 220 receives as inputs the phase angle signal output from the angle converter 218 and the scaled phase compensation signal output from the phase compensation controller. Summing element 220 applies the scaled phase compensation signal to the phase angle signal to generate a compensated phase angle signal.

The compensated phase angle signal output from summing element 220 serves as an input to the delay element 232 and the summing element 234. In the summing element 234, the one-symbol period delayed compensated phase angle signal output from the delay element 232 is subtracted from the compensated phase angle signal corresponding to the current symbol, as output from the summing node 220. Therefore, the output from the summing element 234 represents the compensated difference between phase angle transition values of the present (n) and immediately preceding symbols (n-1) in the received signal. This is referred to as the compensated phase angle difference signal.

Symbol detector 236 receives as its input the compensated phase angle difference signal output from the summing element 234 as described above. The symbol detector 236 maps the phase angle values it detects in its input signal to the nearest or closest defined phase angle transitions for the π/4 DQPSK modulation scheme. In so doing, the symbol detector 236 is able to identify the received symbols and, additionally, a corresponding phase error for each of those received symbols based on the difference between the actual detected phase angle transition value and the nearest or closest defined phase angle transition value. The detected symbol is mapped into its corresponding two-bit binary value in the symbol detector 236 and output as even and odd bit streams to the parallel-to-serial (P/S) converter 238. The P/S converter 238 combines the even and odd bit streams into a single serial digital output.

The phase error signal output from the symbol detector 236 serves as an input to the tracking loop 224 and the phase compensation controller 230. During the data portion of each received TDMA frame, the phase error signal feeding back to the tracking loop 224 permits the receiver, depicted as 102 in FIG. 1, to operate using phase coherent demodulation. In phase coherent demodulation, the actual phase of the received signal is tracked and used to compensate for errors in the phase compensation signal. In the present invention, the phase compensation controller 230 permits receiver operation with fully phase coherent demodulation when the phase error signal output from the symbol detector 236 is low. As phase errors in the symbol decoding increase, indicated by increasing phase error signal magnitude, the phase compensation 230 controller proportionately reduces its phase compensation scaling factor applied to the tracking phase compensation signal generated by the tracking loop 224 from the full scale value of one to some appropriate fractional value between one and zero. Operation with fractionally scaled phase compensation is termed "partially coherent" demodulation. Once phase errors increase beyond a given magnitude, this indicates that the receiver's phase compensation is so inaccurate as to no longer serve to minimize errors in the received data, and non-coherent demodulation is preferable. In non-coherent demodulation, no phase compensation is applied to the phase angle signal output from the angle converter 218. In the present invention, non-coherent demodulation is accomplished by the phase compensation controller 230 setting its phase compensation scaling factor to a value of zero, thereby scaling the phase compensation signal output from the tracking loop 224 to zero.

Figure 4:
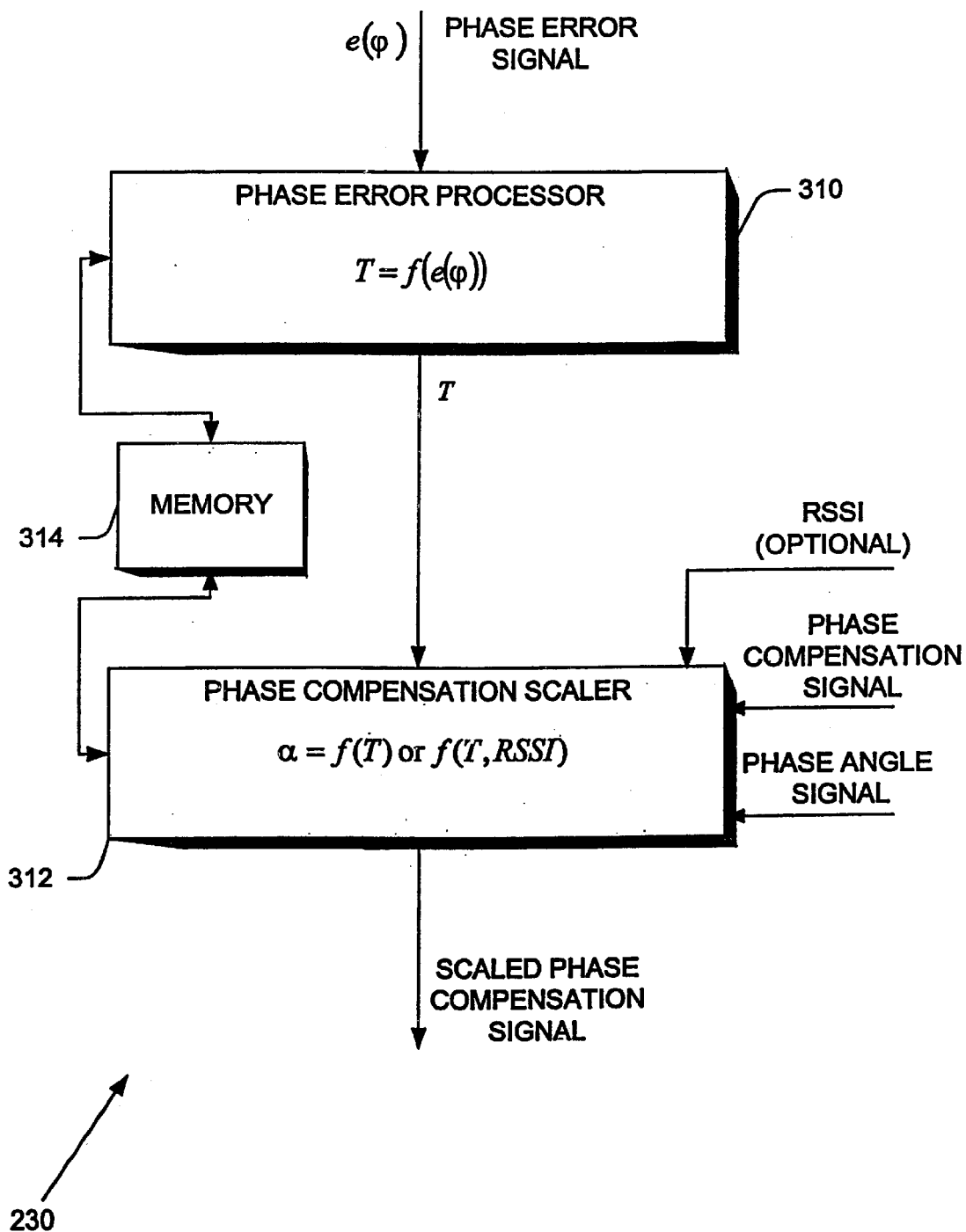
FIG. 4 is a detailed depiction of one embodiment of the phase compensation controller used in the present invention.

The phase compensation controller 230 in FIG.3 appears in more detail in FIG.4. In FIG. 4, phase compensation controller 230 comprises a phase error processor 310, a read/write memory element 314, and a phase compensation scaler 312. The phase error signal $e(\phi)$ output from the symbol detector 236 in FIG.3 serves as an input to the phase error processor 310. Using memory element 314, the phase error processor 310 accumulates the magnitude of the phase error signal over n samples, corresponding to the individual phase errors for the last n received symbols. The value of n may represent a number smaller than the total number of symbols received in a single TDMA frame, or may represent a symbol count spanning multiple TDMA frames. The optimal value for n can be predetermined for a given communications system. After accumulating n phase error values, the phase error processor calculates a demodulation quality indicator Tin accordance with any one of the following equations, $$T = l_2 e(\varphi) = \frac{1}{N} \sum_{n=1}^{N-1} e_n^2(\varphi) \quad \text{(Eq. 1)}$$

$$T = l_1 e(\varphi) = \frac{1}{N} \sum_{n=1}^{N-1} |e_n(\varphi)| \quad \text{(Eq. 2)}$$

$$T = l_{\text{RMS}} e(\varphi) = \left[ \frac{1}{N} \sum_{n=1}^{N-1} e_n^2(\varphi) \right]^{\frac{1}{2}} \quad \text{(Eq. 3)}$$

Previous values for the phase error signal e(φ) are stored in memory element 314 by the phase error processor 310. Those skilled in the art will readily appreciate that storage and retrieval of past values for the phase error signal e(φ) may alternatively be performed by other processing means in cooperation with the phase error processor 310 without departing from the spirit of the depicted operation. Further, the demodulation quality indicator T may be determined using many other functions in addition to those presented above without departing from the intent of the present invention.

The demodulation quality indicator T serves as an input to the phase compensation scaler 312. Phase compensation scaler 312 applies a scaling or weighting factor to the phase compensation signal output by the tracking loop 224 in FIG. 3. This factor is termed the phase compensation scaling factor, denoted as α. The value of a is a function of the demodulation quality indicator T and, optionally, also a function of the received signal strength indicator signal RSSI. Because RSSI circuits are well known in the art and the manner in which the RSSI signal is derived is not critical to understanding the present invention, RSSI circuits are not explained or diagrammed. The phase compensation controller 312 scales the phase compensation signal using the value of α. When α=1, the scaled phase compensation signal output from the phase compensation scaler 312 is equivalent to the input phase compensation signal. When α=0, the scaled phase compensation signal is null or zero. For fractional values of α between 1 and 0, the scaled compensation signal is a corresponding fraction of the phase compensation signal input to phase compensation scaler 312. The phase compensation scaler 312 may use memory element 314 and may, in one embodiment, be functionally incorporated into other system processing elements that may also include the functionality of the phase error processor 310 and memory element 314.

Figure 5:
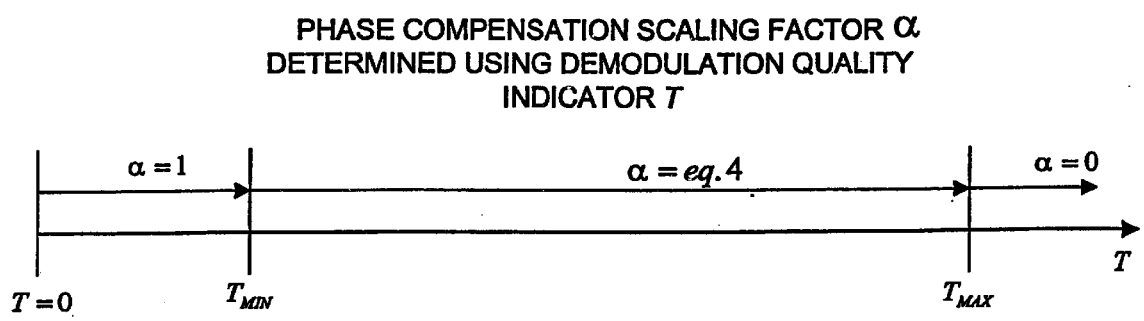
FIG. 5 depicts the determination of the phase compensation scaling factor as a function of the phase error signal magnitude in accordance with the present invention.

FIG. 5 illustrates calculation of the demodulation quality indicator T using only the phase error signal e(φ) and highlights the comparison between the calculated value of T and first ($T_{MIN}$) and second ($T_{MAX}$) predetermined threshold values. As shown in FIG.5, when T is greater than $T_{MAX}$, demodulation is non-coherent and the scaling factor α=0. When T is less than $T_{MIN}$, demodulation is fully coherent and α=1. Between $T_{MIN}$ and $T_{MAX}$, demodulation is partially coherent.

Figure 6:
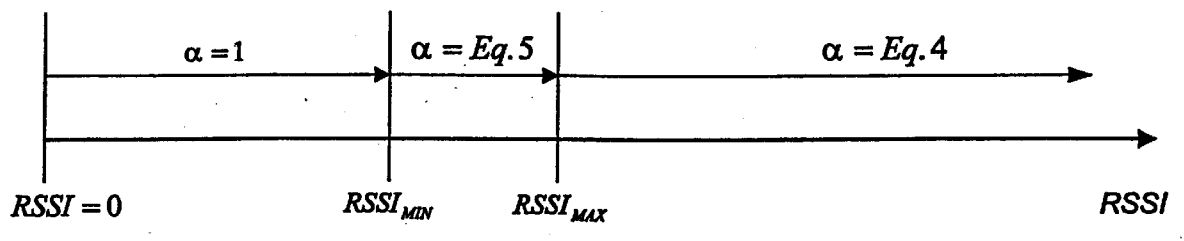
FIG. 6 depicts the determination of the phase compensation scaling factor as a function of the received signal strength indicator in accordance with the present invention.

FIG. 6 illustrates calculation of the demodulation quality indicator T in added consideration of the value of a received signal strength indicator, RSSI. For demodulation quality indicator values below $T_{MIN}$ or above $T_{MAX}$, the logic illustrated in FIG. 6 is identical to that shown in FIG. 5. However, for demodulator quality indicator values in the range $T_{MIN} \leq T \leq T_{MAX}$, the value of RSSI is used in combination with the value of T to calculate the scaling factor α. In this range for T, α=1 when RSSI is below a first predetermined threshold ($RSSI_{MIN}$), maintaining fully coherent demodulation for low received signal strength. When the received signal strength is in the range $RSSI_{MIN} < RSSI < RSSI_{MAX}$, where $RSSI_{MAX}$ is a second predetermined threshold, the scaling factor α is based on both RSSI and T, according to Eq. 5. For RSSI above $RSSI_{MAX}$, the scaling factor α is determined using Eq. 4, in the same manner illustrated in FIG. 5. Additional details regarding adaptive demodulation operation appear below.

Figure 7:
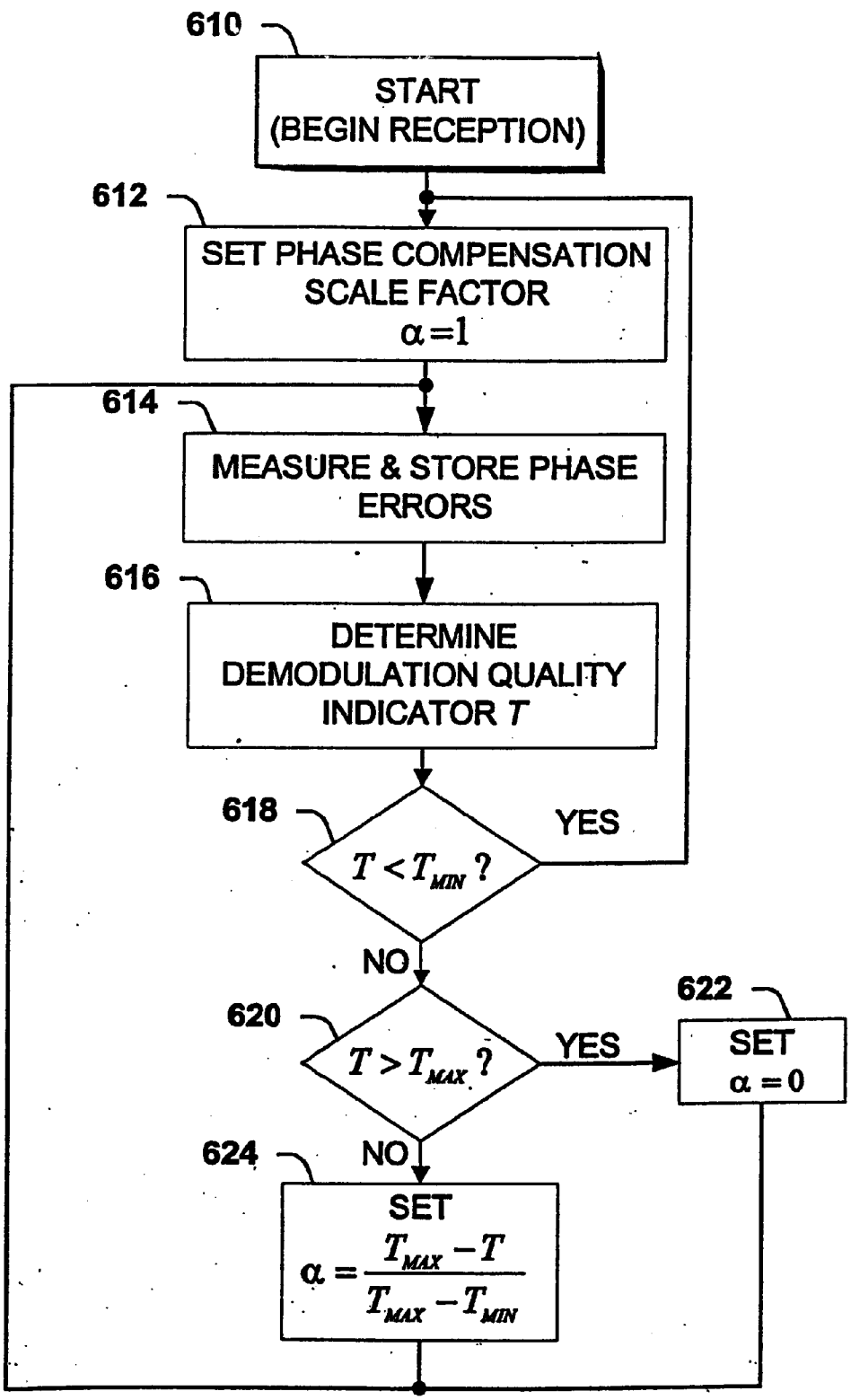
FIG. 7 depicts the operating logic of the adaptive demodulator in accordance with the preferred embodiment of the present invention.

FIG. 7 presents logical operating flow for a receiver using adaptive demodulation according to the present invention. Reception begins in block 610 and, by default, the adaptive demodulation technique defaults to fully coherent, as accomplished by setting the value of the phase compensation scaling factor to one (α=1) in block 612. The phase error signal magnitude is accumulated over n symbol periods in block 614. After accumulating the n phase error samples, the receiver using adaptive demodulation determines the value of the demodulation quality indicator T, in block 616. T is then compared against the first predetermined threshold $T_{MIN}$ in decision block 618. Low values of T indicate that the phase compensation signal is accurately compensating the phase of the phase angle transition value signal, so it is appropriate to continue fully coherent demodulation. Processing returns to block 612 and α remains equal to 1.

However, if the value of T equals or exceeds $T_{MIN}$, processing continues to decision block 620, where T is compared to the second predetermined threshold, $T_{MAX}$. If T is greater than $T_{MAX}$, this indicates poor accuracy in the phase compensation signal and the phase compensation scaling factor is set to zero (α=0) in block 622. This results in no phase compensation being applied to the phase angle signal and the receiver operates with fully non-coherent demodulation. However, if the value of T is between $T_{MIN}$ and $T_{MAX}$, end-points inclusive, then the phase compensation scaling factor a is calculated in block 624 according to the following equation, $$\alpha = \frac{T_{MAX} - T}{T_{MAX} - T_{MIN}} \quad \text{(Eq. 4)}$$

Processing from either block 622 or 624 returns to block 614 where the accumulation of phase errors starts over.

Figure 8:
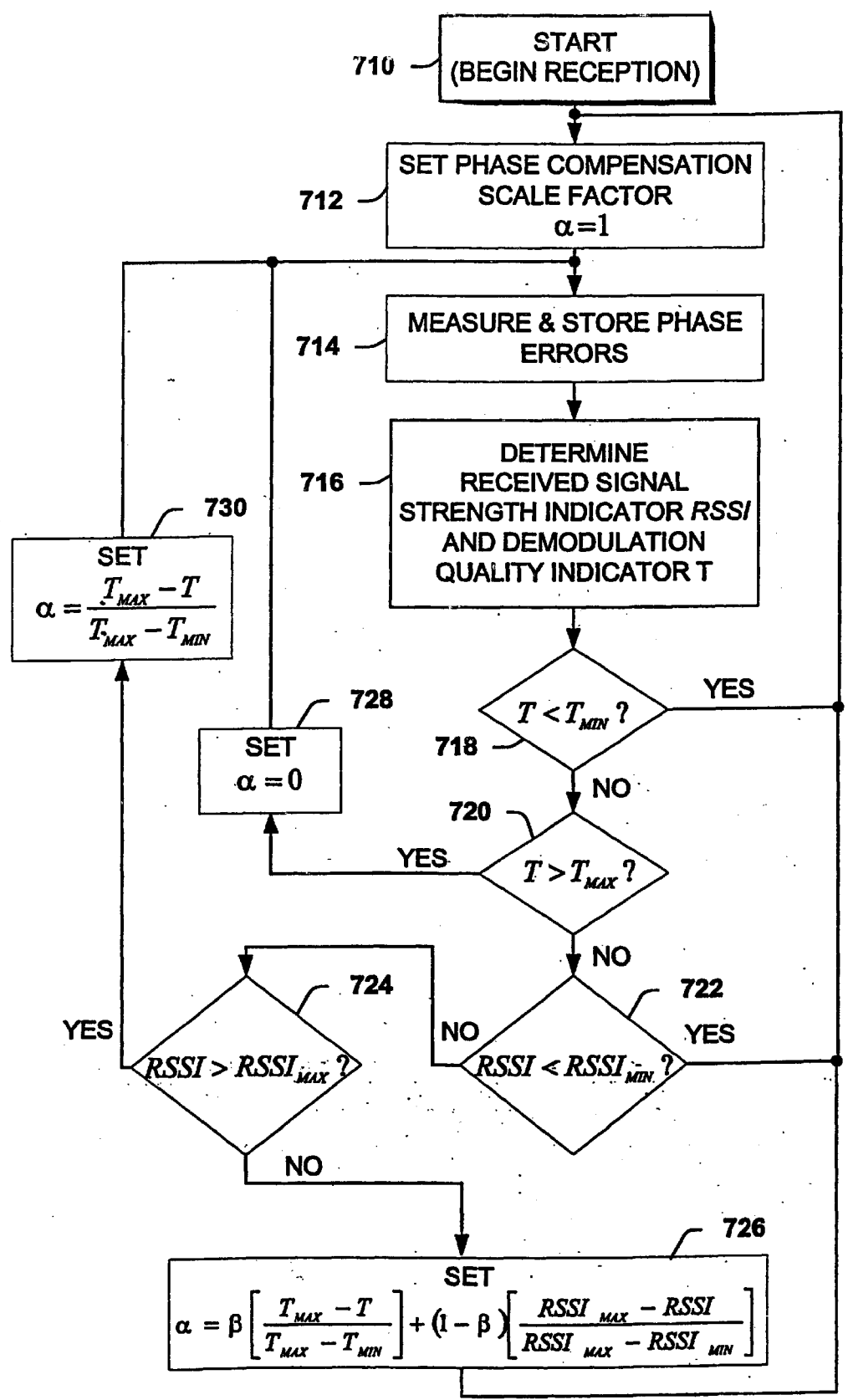
FIG. 8 depicts the operating logic of the adaptive demodulator in accordance with an alternate embodiment of the present invention.

FIG. 8 presents operating logic for the present invention when RSSI is optionally applied to the calculation of the phase compensation scaling factor α. Initial operation is identical to that described for FIG. 7, however, block 716 includes determination of the value of RSSI in addition to the value of the demodulation quality indicator T. In decision block 718, T is compared to $T_{MIN}$. If T is less than $T_{MIN}$, processing is returned to block 712 where the value of α is set to 1 and the receiver operates with fully coherent demodulation. If T is equal to or greater than $T_{MIN}$, the value of T is compared against $T_{MAX}$ in decision block 720. If the value of T is greater than $T_{MAX}$, the value of α is set to 0, resulting in the receiver operating with fully non-coherent demodulation. Processing is returned to block π/4 so the demodulation quality index T can be recalculated. If T is not greater than $T_{MAX}$, then processing continues in decision block 722. The value of the RSSI signal is compared to a first RSSI threshold value ($RSSI_{MIN}$) and if RSSI is less than this threshold, processing is returned to block 712, where the value of α is set to 1 and the receiver operates with fully coherent demodulation. If RSSI is not less than $RSSI_{MIN}$, then its value is compared to a second RSSI threshold ($RSSI_{MAX}$) in block 724. If RSSI is greater than $RSSI_{MAX}$, then the phase compensation scaling factor a is determined according to block 730 (Eq. 4). This sets α to a fractional value between 0 and 1 and the receiver operates with partially coherent demodulation. From block 730, processing returns to 714. If RSSI is not greater than $RSSI_{MAX}$ in block 724, then processing continues to block 726. In block 726, the phase compensation scaling factor a is determined according to Eq. 5 below, $$\alpha = \beta\left[\frac{T_{MAX} - T}{T_{MAX} - T_{MIN}}\right] + (1-\beta)\left[\frac{RSSI_{MAX} - RSSI}{RSSI_{MAX} - RSSI_{MIN}}\right] \quad (Eq. 5)$$

where $\Delta RSSI = RSSI_{MAX} - RSSI_{MIN}$ and $0 < \beta < 1$, such that β ensures Eq. 5 does not exceed "1" and further permits weighting the influence of T versus RSSI in determining the phase compensation scaling factor α. This action results in the receiver operating with partially coherent demodulation based on both the demodulation quality index T and the value of RSSI.

The values for first and second demodulation quality indicator thresholds, $T_{MIN}$ and $T_{MAX}$, may be experimentally determined for a given receiver design. These predetermined values may then be used as constants in the design implementation. Note that the present invention contemplates operation with a defined range of values between $T_{MIN}$ and $T_{MAX}$, as illustrated in both FIGS. 4 and 5 and defined by Eq. 4. However, the present invention may be practiced with $T_{MIN}$ and $T_{MAX}$ set to a common threshold, in which case the receiver operates with fully coherent detection when T is below the common threshold and with fully non-coherent operation when T is above the common threshold. Values for first and second received signal strength thresholds, $RSSI_{MIN}$ and $RSSI_{MAX}$, may likewise be experimentally determined for given receiver design and used as constant values in the design implementation, or may be variable during receiver operation. The present invention may be practiced with greater or fewer thresholds for demodulation quality indicator T and the received signal strength indicator than identified above without departing from the intent of the present invention. Further, note that although the present invention is described above in the context of π/4 DQPSK having differentially encoded symbols, operation with non-differentially-encoded symbols is within the scope of the present invention.

What is claimed is:

1. An adaptive demodulation method comprising:
   receiving a phase modulated signal over a plurality of successive periods including a first period and a-second period subsequent to said first period;
   computing a phase error indicator value as a function of the phase error in the received signal over said first period;
   coherently demodulating the received signal in said second period when the phase error indicator computed during said first period is below a predetermined threshold; and
   non-coherently demodulating the received signal in said second period when the phase error indicator computed during said first period is above the predetermined threshold.

2. The adaptive demodulation method of claim 1 wherein the phase error indicator is computed as the average of the absolute value of the phase error over a plurality of symbol periods.

3. The adaptive demodulation method of claim 1 wherein the phase error indicator is computed as the average of the square of the phase error over a plurality of symbol periods.

4. The adaptive demodulation method of claim 1 wherein the phase error indicator is the root mean square of the phase error over a plurality of symbol periods.

5. The adaptive demodulation method of claim 1 wherein the computation of the phase error indicator is dependent on the signal strength of the received signal.

6. An adaptive demodulation method comprising:
   receiving phase modulated signals over a plurality of successive periods including a first period and a second period subsequent to said first period;
   determining the accumulated phase error in the received signal over said first period based on detected phase angles of said received signal;
   generating a phase correction signal based on the accumulated phase error during said first period;
   scaling the phase correction signal based on computing a phase error indicator as a function of the accumulated phase error, and computing a scaling factor as a function of the phase error indicator;
   correcting detected phase angle signals generated for said received signal during said second period by applying the scaled phase correction signal to the detected phase angle signals generated for said received signals in said second period; and
   demodulating the received signals in said second period based on the corrected phase angle signals.

7. The adaptive demodulation method of claim 6 wherein the phase angle signal represents the phase angle of the received signal.

8. The adaptive demodulation method of claim 6 wherein the phase angle signal represents the differential phase angle of the received signal.

9. The adaptive demodulation method of claim 6 wherein the phase error indicator is computed as the average of the absolute value of the phase error over a plurality of symbol periods.

10. The adaptive demodulation method of claim 6 wherein the phase error indicator is computed as the average of the square of the phase error over a plurality of symbol periods.

11. The adaptive demodulation method of claim 6 wherein the phase error indicator is the root mean square of the received signal over a plurality of symbol periods.

12. The adaptive demodulation method of claim 6 wherein the computation of the phase error indicator is dependent on the signal strength of the received signal.

13. An apparatus for demodulating received information signals comprising a plurality of symbols, the apparatus comprising:
   a receiver for receiving said information signals over a plurality of successive periods including a first period and a second period subsequent to said first period;
   a phase detector for determining the phase of the information signals during each symbol period and generating a phase angle signal;
   a phase compensation circuit for generating a phase angle compensation signal based on phase error signals;
   a phase compensation controller operatively connected to said phase compensation circuit to compute a phase error indicator as a function of the phase error in the received information signal over a plurality of symbol periods, and to scale said phase angle compensation signal based on said phase error indicator;

a summing node for combining said phase angle signal with said scaled phase angle compensation signal to generate a corrected phase angle signal; and a symbol detector for determining the received symbols in said information signal based on said corrected phase angle signals and generating said phase error signals.

14. The apparatus of claim 13 wherein the phase angle signal generated by said phase detector represents the phase angle of the received signal.

15. The apparatus of claim 13 wherein the phase angle signal generated by said phase detector represents the differential phase angle of the received signal.

16. The apparatus of claim 13 wherein the phase error indicator is computed as the average of the square of the phase error over a plurality of symbol periods.

17. The apparatus of claim 13 wherein the phase error indicator is the root mean square of the received signal over a plurality of symbol periods.

18. The apparatus of claim 13 wherein the computation of the phase error indicator is dependent on the signal strength of the received signal.

19. An adaptive demodulation method comprising:

receiving a phase modulated signal and generating an initial phase compensation signal;

demodulating the received signal during a first period based on applying said initial phase compensation signal to detected phase angles of said received signal;

accumulating phase angle errors over a plurality of symbol periods of said received signal during said first period;

generating a phase error indicator based on said accumulation of phase angle errors;

scaling the initial phase compensation signal as a function of the phase error indicator to obtain a scaled phase compensation signal; and demodulating said received signal during a second period subsequent to said first period based on applying said scaled phase compensation signal to detected phase angles of said received signal.

20. The method of claim 19, wherein applying said initial phase compensation signal or applying said scaled phase compensation signal comprises, respectively, combining said initial phase compensation signal with said detected phase angles during said first period and combining said scaled phase compensation signal with said detected phase angles during said second period.

21. The method of claim 19, wherein scaling the initial phase compensation signal as a function of the phase error indicator to obtain a scaled phase compensation signal comprises:

setting a compensation signal scaler value to zero if the phase error indicator is above a maximum threshold, such that demodulation of said received signal during said second period is non-coherent demodulation;

setting the compensation signal scaler value to unity if the phase error indicator is below a minimum threshold, such that demodulation of said received signal during said second period is coherent demodulation; and setting the compensation signal scaler value in proportion to the phase error indicator if the phase error indicator is between the minimum and maximum thresholds.

22. The method of claim 19 wherein the phase error indicator is computed as the average of the square of the phase error over a plurality of symbol periods.

23. The method of claim 19 wherein the phase error indicator is the root mean square of the received signal over a plurality of symbol periods.

24. The method of claim 19 wherein the computation of the phase error indicator is dependent on the signal strength of the received signal.

* * * * *